United States Patent
Elmegaard-Fessel

(10) Patent No.: US 8,619,972 B2
(45) Date of Patent: Dec. 31, 2013

(54) METHOD AND SYSTEM FOR ATOMICITY FOR ELLIPTIC CURVE CRYPTOSYSTEMS

(75) Inventor: Lars Elmegaard-Fessel, Charlottenlund (DK)

(73) Assignee: International Business Machines Corporation, Armonk, NY (US)

(*) Notice: Subject to any disclaimer, the term of this patent is extended or adjusted under 35 U.S.C. 154(b) by 742 days.

(21) Appl. No.: 12/191,432

(22) Filed: Aug. 14, 2008

(65) Prior Publication Data

US 2009/0046851 A1 Feb. 19, 2009

(30) Foreign Application Priority Data

Aug. 17, 2007 (EP) .................................. 07114525

(51) Int. Cl.
*G06F 21/00* (2013.01)
(52) U.S. Cl.
USPC .................................. 380/28; 380/29; 380/30
(58) Field of Classification Search
USPC ...................................................... 380/28–30
See application file for complete search history.

(56) References Cited

U.S. PATENT DOCUMENTS

| | | | | |
|---|---|---|---|---|
| 2002/0062330 | A1* | 5/2002 | Paar et al. | 708/492 |
| 2004/0158597 | A1* | 8/2004 | Ye et al. | 708/492 |
| 2006/0098814 | A1* | 5/2006 | Al-Khoraidly et al. | 380/28 |
| 2008/0025500 | A1* | 1/2008 | Izu et al. | 380/28 |
| 2008/0205638 | A1* | 8/2008 | Al-Gahtani et al. | 380/30 |
| 2009/0016523 | A1* | 1/2009 | Dupaquis et al. | 380/28 |

OTHER PUBLICATIONS

Lars Elmegaard-Fessel, Efficient Scalar Multiplication and Security against Power Analysis in Cryptosystems based on the NIST Elliptic Curves Over Prime Fields, Aug. 1, 2006, 203 pages; Retrieved from http://eprint.iacr.org/2006/313.pdf.*
Tanja Lange, Handbook of Elliptic and Hyperelliptic Curve Cryptography, Chapter 29: Mathematical Countermeasures against Side-Channel Attacks, Jul. 2005, pp. 687-714, Retrieved from http://dx.doi.org/10.1201/9781420034981.ch29.*
Cohen et al., Efficient Elliptic Curve Exponentiation Using Mixed Coordinates, 1998, pp. 1-16, Retrieved from https://dspace.jaist.ac.jp/dspace/bitstream/10119/4458/1/73-53.pdf.*
Chevallier-Mames et al, "Low-Cost Solutions for Preventing Simple Side-Channel Analysis: Side-Channel Atomicity", IEEE Transactions on Computers, vol. 53, No. 6, Jun. 2004, pp. 760-768.
PCT, "Notification of Transmittal of the International Search Report and the Written Opinion of the International Searching Authority, or the Declaration", Date of Mailing Dec. 15, 2008.

(Continued)

*Primary Examiner* — Chau Le
(74) *Attorney, Agent, or Firm* — Andrea Bauer; Hoffman Warnick LLC

(57) ABSTRACT

A method and system are provided for atomicity for elliptic curve cryptosystems (ECC-systems). The method includes a side channel atomic scalar multiplication algorithm using mixed coordinates. The mixed coordinates are chosen based on a ratio of I/M where I and M are the time required to execute an inversion and a multiplication in the ground field respectively. If the I/M ratio is less than 60, a mixture of affine and Jacobian coordinates are used during scalar multiplication. If the I/M ratio is 60 or more, a mixture of Chudnovsky-Jacobian and Jacobian coordinates are used during scalar multiplication. The method is optimized for elliptic curves over $F_p$ defined by an equation of the form $y^2=x^3+ax+b$, where $a, b \in F_p$, having $a=-3$.

9 Claims, 10 Drawing Sheets

(56) References Cited

OTHER PUBLICATIONS

Lars Elmegaard-Fessel, "Efficient Scalar Multiplication and Security against Power Analysis in Cryptosystems based on the NIST Elliptic Curves Over Prime Fields", Aug. 1, 2006.

Tetsuya Izu et al., "Improved Elliptic Curve Multiplication Methods Resistant against Side Channel Attacks", Progress in Cryptology-Indocrypt, International Conference Incryptology in India, Dec. 16, 2002, pp. 296-313.

Miyaji et al., "Efficient Elliptic Curve Exponentiation", Asiacrypt, International Conference on the Theory and Application of Cryptology and Information Security, Oct. 18, 1998, pp. 51-65.

Lange et al., "SCA Resistant Parallel Explicit Formula for Addition and Doubling of Divisors in the Jacobian of Hyperelliptic Curves of Genus 2", Progress in Cryptology—Indocrypt 2005 Lecture Notes in Computer Science, Springer, Berlin, DE, vol. 3797, Jan. 1, 2005, pp. 403-416.

Benoit Chevallier-Mames et al, "Low-Cost Solutions for Preventing Simple Side-Channel Analysis: Side-Channel Atomicity", IEEE Transactions on Computers, vol. 53, No. 6, Jun. 1, 2004, pp. 760-768.

National Institute for Standards and Technology, "Digital Signature Standard (DSS)", FIPS Pub 186-2, Jan. 27, 2000, http://csrc.nist.gov/publications/fips/archive/fips186-2/fips186-2.pdf.

National Security Agency, "Fact Sheet NSA Suite B Cryptography", www.nsa.gov/ia/industry/crypto_suite_b.cfm, Mar. 30, 2008.

\* cited by examiner

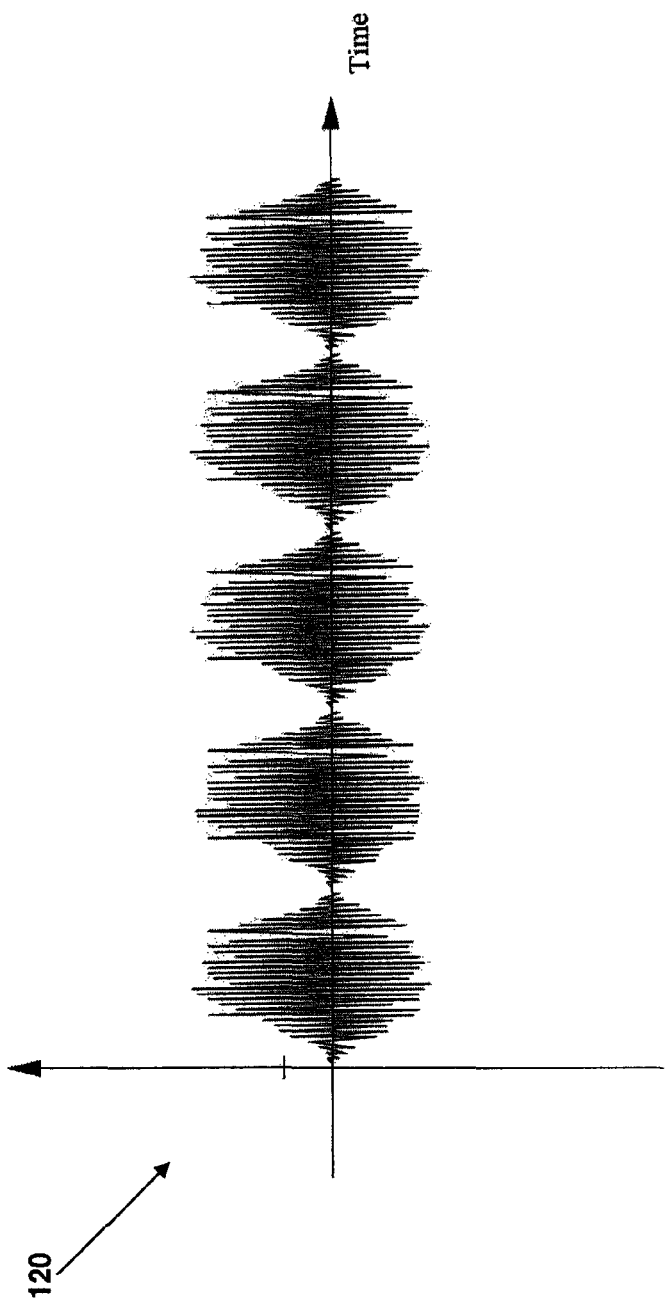

FIG. 2A

| | | | | |
|---|---|---|---|---|
| HPAS elliptic curve doubling. | | | | |
| Input: $P = (R_1, R_2, R_3)$ in Jacobian coordinates. | | | | |
| Output: $[2]P = (R_1, R_2, R_3)$ in Jacobian coordinates. | | | | |
| | M | A | N | A |
| $\Gamma_1$ | $R_4 \leftarrow R_3 \times R_3$ $[Z_1^2]$ | $R_5 \leftarrow R_1 + R_4$ $[X_1 + Z_1^2]$ | $R_4 \leftarrow R_4$ $[-Z_1^2]$ | $R_4 \leftarrow R_1 \times R_4$ $[X_1 - Z_1^2]$ |
| $\Gamma_2$ | $R_4 \leftarrow R_4 \times R_5$ $[(X_1 + Z_1^2)(X_1 - Z_1^2)]$ | $R_5 \leftarrow R_4 + R_4$ $[2(X_1 + Z_1^2)(X_1 - Z_1^2)]$ | * | * |
| $\Gamma_3$ | $R_6 \leftarrow R_2 \times R_3$ $[X_1 \times Z_1]$ | $R_5 \leftarrow R_4 + R_5$ $[B]$ | $R_5 \leftarrow R_5$ $[-B]$ | $R_3 \leftarrow R_6 + R_6$ $[Z_3]$ |
| $\Gamma_4$ | $R_4 \leftarrow R_2 \times R_2$ $[Y_1^2]$ | $R_4 \leftarrow R_4 + R_4$ $[2Y_1^2]$ | * | * |
| $\Gamma_5$ | $R_6 \leftarrow R_4 \times R_1$ $[2X_1 Y_1^2]$ | $R_6 \leftarrow R_6 + R_6$ $[A]$ | $R_6 \leftarrow R_6$ $[-A]$ | $R_7 \leftarrow R_6 + R_6$ $[-2A]$ |
| $\Gamma_6$ | $R_8 \leftarrow R_3 \times R_3$ $[B^2]$ | $R_1 \leftarrow R_7 + R_8$ $[X_3]$ | * | * |
| $\Gamma_7$ | $R_4 \leftarrow R_4 \times R_4$ $[4Y_1^4]$ | $R_4 \leftarrow R_4 + R_4$ $[8Y_1^4]$ | $R_4 \leftarrow R_4$ $[-8Y_1^4]$ | $R_6 \leftarrow R_1 + R_6$ $[X_3 - A]$ |
| $\Gamma_8$ | $R_6 \leftarrow R_5 \times R_6$ $[-B(X_3 - A)]$ | $R_2 \leftarrow R_4 + R_6$ $[Y_3]$ | * | * |

FIG. 2B

| | HPAS elliptic curve addition. |
|---|---|
| | Input: $P = (R_1, R_2, R_3)$ in Jacobian coordinates. |
| | and $Q = (R_{10}, R_{11})$ in affine coordinates. |
| | Output: $P \oplus Q = (R_1, R_2, R_3)$ in Jacobian coordinates. |

| | M | A | N | A |
|---|---|---|---|---|
| $\Gamma_1$ | $R_4 \leftarrow R_3 \times R_3$ $[Z_1^2]$ | * | * | * |
| $\Gamma_2$ | $R_5 \leftarrow R_{10} \times R_4$ $[A]$ | * | $R_5 \leftarrow R_5$ $[-A]$ | * |
| $\Gamma_3$ | $R_6 \leftarrow R_{11} \times R_3$ $[Y_2 \times Z_1]$ | $R_7 \leftarrow R_1 + R_5$ $[E]$ | $R_7 \leftarrow R_7$ $[-E]$ | * |
| $\Gamma_4$ | $R_6 \leftarrow R_6 \times R_4$ $[C]$ | * | * | * |
| $\Gamma_5$ | $R_3 \leftarrow R_7 \times R_3$ $[-EZ_1]$ | * | $R_3 \leftarrow R_3$ $[Z_3]$ | * |
| $\Gamma_6$ | $R_8 \leftarrow R_7 \times R_7$ $[E^2]$ | * | * | * |
| $\Gamma_7$ | $R_5 \leftarrow R_5 \times R_8$ $[-AE^2]$ | $R_9 \leftarrow R_5 + R_5$ $[-2AE^2]$ | $R_6 \leftarrow R_6$ $[-C]$ | * |
| $\Gamma_8$ | $R_7 \leftarrow R_7 \times R_8$ $[-E^3]$ | $R_9 \leftarrow R_7 + R_9$ $[-E^3 - 2AE^2]$ | * | $R_4 \leftarrow R_2 + R_6$ $[F]$ |
| $\Gamma_9$ | $R_1 \leftarrow R_4 \times R_4$ $[F^2]$ | $R_1 \leftarrow R_1 + R_9$ $[X_3]$ | $R_4 \leftarrow R_4$ $[-F]$ | $R_5 \leftarrow R_1 + R_5$ $[X_3 - AE^2]$ |
| $\Gamma_{10}$ | $R_5 \leftarrow R_4 \times R_5$ $[-F(X_3 - AE^2)]$ | * | $R_7 \leftarrow R_7$ $[-E^3]$ | * |
| $\Gamma_{11}$ | $R_2 \leftarrow R_6 \times R_7$ $[-CE^3]$ | $R_2 \leftarrow R_2 + R_5$ $[Y_3]$ | * | * |

HPAS elliptic curve addition.
Input: $P = (R_1, R_2, R_3)$ in Jacobian coordinates.
and $Q = (R_{10}, R_{11}, R_{12}, R_{13}, R_{14})$ in Chudnovsky-Jacobian coordinates.
Output: $P \oplus Q = (R_1, R_2, R_3)$ in Jacobian coordinates.

| | M | A | N | A |
|---|---|---|---|---|
| $\Gamma_1$ | $R_4 \leftarrow R_3 \times R_3$ $[Z_1^2]$ | * | * | * |
| $\Gamma_2$ | $R_5 \leftarrow R_{10} \times R_4$ $[A]$ | * | $R_5 \leftarrow R_5$ $[-A]$ | * |
| $\Gamma_3$ | $R_6 \leftarrow R_{13} \times R_1$ $[B]$ | $R_6 \leftarrow R_6 + R_5$ $[E]$ | $R_6 \leftarrow R_6$ $[-E]$ | * |
| $\Gamma_4$ | $R_7 \leftarrow R_{11} \times R_3$ $[Y_2 Z_1]$ | * | * | * |
| $\Gamma_5$ | $R_7 \leftarrow R_7 \times R_4$ $[C]$ | * | * | * |
| $\Gamma_6$ | $R_3 \leftarrow R_6 \times R_3$ $[-EZ_1]$ | * | $R_3 \leftarrow R_3$ $[EZ_1]$ | * |
| $\Gamma_7$ | $R_3 \leftarrow R_3 \times R_{12}$ $[Z_3]$ | * | * | * |
| $\Gamma_8$ | $R_8 \leftarrow R_6 \times R_6$ $[E^2]$ | * | * | * |
| $\Gamma_9$ | $R_5 \leftarrow R_5 \times R_8$ $[-AE^2]$ | $R_9 \leftarrow R_5 + R_5$ $[-2AE^2]$ | $R_7 \leftarrow R_7$ $[-C]$ | * |
| $\Gamma_{10}$ | $R_4 \leftarrow R_2 \times R_{14}$ $[D]$ | * | * | * |
| $\Gamma_{11}$ | $R_6 \leftarrow R_6 \times R_8$ $[-E^3]$ | $R_9 \leftarrow R_6 + R_9$ $[-E^3 - 2AE^2]$ | * | $R_4 \leftarrow R_4 + R_7$ $[F]$ |
| $\Gamma_{12}$ | $R_1 \leftarrow R_4 \times R_4$ $[F^2]$ | $R_1 \leftarrow R_1 + R_9$ $[X_3]$ | $R_4 \leftarrow R_4$ $[-F]$ | $R_5 \leftarrow R_1 + R_5$ $[X_3 - AE^2]$ |
| $\Gamma_{13}$ | $R_5 \leftarrow R_4 \times R_5$ $[-F(X_3 - AE^2)]$ | * | $R_6 \leftarrow R_6$ $[E^3]$ | * |
| $\Gamma_{14}$ | $R_2 \leftarrow R_6 \times R_7$ $[-CE^3]$ | $R_2 \leftarrow R_2 + R_5$ $[Y_3]$ | * | * |

$$\begin{bmatrix} 4 & 3 & 3 & 5 & 1 & 4 & 4 & 4 & 1 & 4 \\ 4 & 4 & 5 & 5 & 4 & 4 & 6 & 6 & 4 & 5 \\ 6 & 2 & 3 & 5 & 4 & 5 & 5 & 3 & 6 & 6 \\ 4 & 2 & 2 & 4 & 4 & 4 & 6 & 6 & 4 & 5 \\ 6 & 4 & 1 & 6 & 6 & 6 & 6 & 7 & 6 & 6 \\ 8 & 5 & 5 & 1 & 7 & 8 & 7 & 7 & 2 & 3 \\ 4 & 4 & 4 & 4 & 4 & 4 & 4 & 6 & 1 & 6 \\ 6 & 5 & 6 & 2 & 4 & 6 & 8 & 8 & 4 & 5 \\ 4 & 3 & 3 & 5 & 2 & 3 & 5 & 5 & 3 & 4 \\ 5 & 10 & 4 & 6 & 10 & 4 & 5 & 6 & 5 & 10 \\ 6 & 11 & 3 & 7 & 1 & 5 & 7 & 8 & 5 & 7 \\ 6 & 6 & 4 & 8 & 6 & 4 & 8 & 8 & 4 & 8 \\ 3 & 7 & 3 & 8 & 7 & 3 & 3 & 8 & 8 & 7 \\ 8 & 7 & 7 & 9 & 10 & 11 & 9 & 9 & 8 & 7 \\ 5 & 5 & 8 & 9 & 5 & 5 & 6 & 4 & 5 & 8 \\ 7 & 7 & 8 & 9 & 7 & 9 & 4 & 4 & 2 & 6 \\ 1 & 4 & 4 & 1 & 1 & 9 & 4 & 5 & 1 & 5 \\ 5 & 4 & 5 & 8 & 5 & 5 & 7 & 8 & 5 & 7 \\ 2 & 6 & 7 & 2 & 2 & 5 & 7 & 7 & 2 & 5 \end{bmatrix}$$

$$\begin{bmatrix} 4 & 3 & 3 & 5 & 1 & 4 & 4 & 4 & 1 & 4 \\ 4 & 4 & 5 & 5 & 4 & 4 & 6 & 6 & 4 & 5 \\ 6 & 2 & 3 & 5 & 4 & 5 & 5 & 3 & 6 & 6 \\ 4 & 2 & 2 & 4 & 4 & 4 & 6 & 6 & 4 & 5 \\ 6 & 4 & 1 & 6 & 6 & 6 & 6 & 7 & 6 & 6 \\ 8 & 5 & 5 & 1 & 7 & 8 & 7 & 7 & 2 & 3 \\ 4 & 4 & 4 & 4 & 4 & 4 & 4 & 6 & 1 & 6 \\ 6 & 5 & 6 & 2 & 4 & 6 & 8 & 8 & 4 & 5 \\ 4 & 3 & 3 & 5 & 3 & 3 & 5 & 5 & 4 & 4 \\ 5 & 10 & 4 & 6 & 10 & 5 & 5 & 6 & 10 & 4 \\ 6 & 13 & 1 & 6 & 6 & 5 & 6 & 7 & 6 & 5 \\ 7 & 11 & 3 & 8 & 11 & 2 & 11 & 8 & 7 & 11 \\ 7 & 7 & 4 & 8 & 7 & 4 & 8 & 8 & 2 & 4 \\ 3 & 6 & 3 & 8 & 8 & 3 & 3 & 8 & 6 & 3 \\ 3 & 3 & 12 & 8 & 3 & 11 & 9 & 9 & 8 & 3 \\ 8 & 6 & 6 & 9 & 8 & 6 & 9 & 9 & 12 & 3 \\ 5 & 5 & 8 & 9 & 5 & 5 & 7 & 4 & 2 & 1 \\ 4 & 2 & 14 & 1 & 4 & 14 & 1 & 1 & 1 & 2 \\ 6 & 6 & 8 & 9 & 6 & 9 & 1 & 4 & 4 & 7 \\ 1 & 4 & 4 & 1 & 1 & 9 & 4 & 5 & 1 & 5 \\ 5 & 4 & 5 & 8 & 6 & 1 & 6 & 8 & 5 & 4 \\ 2 & 6 & 7 & 2 & 2 & 5 & 8 & 7 & 6 & 5 \end{bmatrix}$$

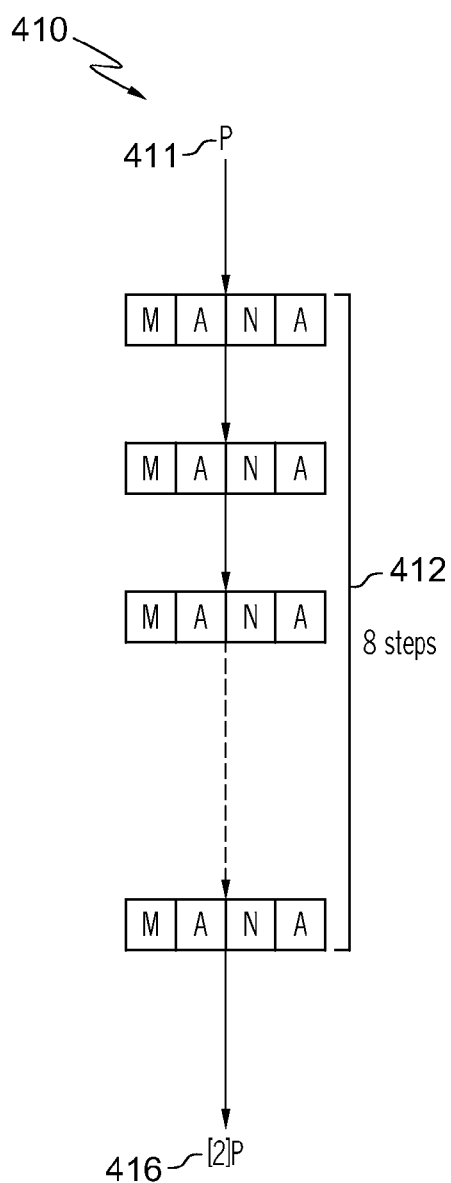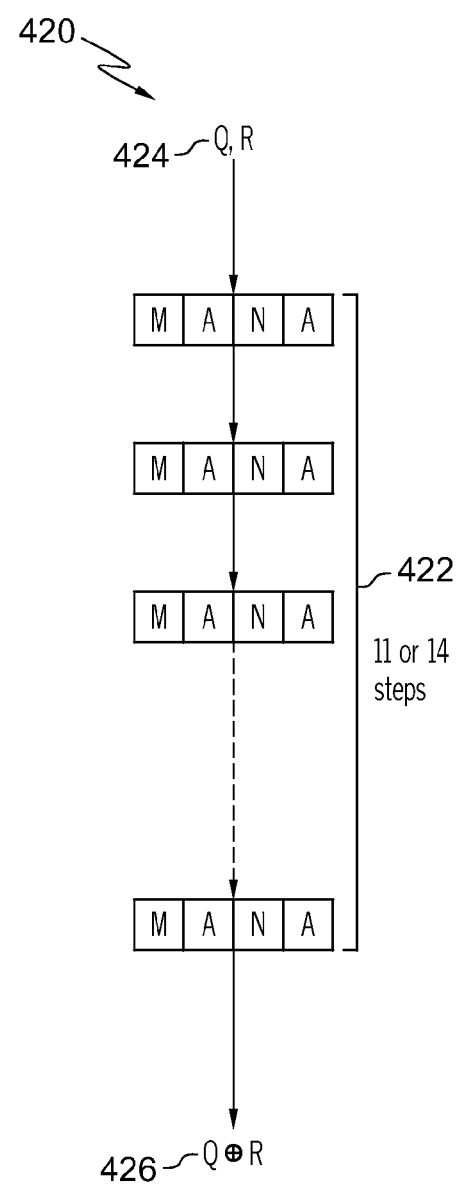

METHOD AND SYSTEM FOR ATOMICITY FOR ELLIPTIC CURVE CRYPTOSYSTEMS

FIELD OF THE INVENTION

This invention relates to the field of encryption. In particular, the present invention relates to atomicity for cryptosystems based on elliptic curves over finite fields (ECC-systems).

BACKGROUND OF THE INVENTION

An elliptic curve is a plane curve defined by an equation of the form:

$$y^2 = x^3 + ax + b.$$

The set of points on such a curve (i.e., all solutions of the equation together with a point at inanity) can be shown to form an abelian group with the point at infinity as the identity element. If the coordinates x and y are chosen from a finite field, the solutions form a finite abelian group. The discrete logarithm problem on such elliptic curve groups is believed to be more difficult than the corresponding problem in the multiplicative group of non-zero elements of the underlying finite field. Thus keys in elliptic curve cryptography can be chosen to be much shorter than RSA algorithm keys for a comparable level of security.

Due to the nature of the algorithms used in ECC-system, these systems are vulnerable to so-called side channel attacks which are based on analysis of the power consumption in the system. The most commonly used method is simple power analysis (SPA) in which an attacker needs only a single power trace from an execution of the scalar multiplication algorithm in the ECC-system to deduce the secret key. This is possible as the scalar multiplication algorithm processes the bits in the secret key one by one and consumes different amounts of power depending on whether the value of a given bit is 0 or 1.

An attacker analyzing the power consumption in an ECC-system will, therefore, see a trace 110 as shown in FIG. 1A. From the trace 110, the attacker can deduce that the bits of the secret key processed were 0001.

There exist various countermeasures against SPA, but all of these reduce the performance of the system to some extent. This is a major problem as performance is usually a major issue in cryptographic applications.

Among the known countermeasures, the method known as side channel atomicity results in the least performance penalty. Side channel atomicity was originally described in B. Chevallier-Mames, M. Ciet and M. Joye, "Low-Cost Solutions for Preventing Simple Side-Channel Analysis: Side-Channel Atomicity" in IEEE Transactions on Computers, volume 53, 2004 (referred to herein as Chevallier-Mames et al). The basic idea of the countermeasure is to rewrite the scalar multiplication algorithm to make it appear as if it consisted of a sequence of identical blocks ("atoms") with indistinguishable power traces. With side channel atomicity enabled an attacker will see a trace 120 as in FIG. 1B. No information about the secret key can be deduced from this trace 120.

There are, however, two serious problems with the known solution of side channel atomicity. First, the solution does not apply to high performance ECC-systems which make use of mixed coordinate representations of the curves being used. The solution only applies to situations where a fixed coordinate representation is used. As the use of mixed coordinate representations is necessary in highly optimized ECC-systems, this makes the solution of side channel atomicity less attractive. Second, the solution does not make use of the optimizations available for the curves recommended by NIST (see National Institute for Standards and Technology, "FIPS PUB 186-2"). This means that the solution introduces a higher performance penalty than necessary for the NIST curves. As these curves are described in open standards and are selected by the NSA for the Suite B algorithms (see National Security Agency, "Fact Sheet NSA Suite B Cryptography", this is a major drawback for the solution of side channel atomicity.

SUMMARY OF THE INVENTION

It is an aim of the present invention to provide a solution to atomicity of ECC-systems which, as well from incorporating all the advantages from the side channel atomic solution, it must support the use of mixed coordinates. A further aim is to support the use of optimizations available for the NIST curves.

According to a first aspect of the present invention there is provided a method of providing atomicity for cryptosystems based on elliptic curves, comprising: a side channel atomic scalar multiplication algorithm using mixed coordinates, including: repeating a sequence of field operations for each elliptic curve addition or doubling operation to provide an atomic block, wherein an atomic block appears equivalent by side-channel analysis; choosing the coordinates based on a ratio of I/M where I and M are the time required to execute an inversion and a multiplication in the ground field respectively.

The side channel atomic scalar multiplication algorithm is preferably optimized for elliptic curves over $F_p$ defined by an equation of the form $y^2 = x^3 + ax + b$, where a, $b \in F_p$, having $a = -3$.

If the I/M ratio is less than 60, a mixture of affine and Jacobian coordinates are preferably used during scalar multiplication. If the I/M ratio is 60 or more, a mixture of Chudnovsky-Jacobian and Jacobian coordinates are preferably used during scalar multiplication.

The sequence of field operations may start with a multiplication operation and may be a multiplication, an addition, a negation, and an addition.

According to a second aspect of the present invention there is provided an elliptic curve cryptography system (ECC-system) providing atomicity, comprising: means for encryption including means for applying a side channel atomic scalar multiplication using mixed coordinates, including: means for repeating a sequence of field operations for each elliptic curve addition or doubling operation to provide an atomic block, wherein an atomic block appears equivalent by side-channel analysis; and means for choosing the coordinates based on a ratio of I/M where I and M are the time required to execute an inversion and a multiplication in the ground field respectively; and means for transferring encrypted data, wherein the encrypted data is protected from side-channel analysis.

According to a third aspect of the present invention there is provided a computer program product stored on a computer readable storage medium, comprising computer readable program code for performing the steps of, when executed on a computer: a side channel atomic scalar multiplication algorithm using mixed coordinates, including: repeating a sequence of field operations for each elliptic curve addition or doubling operation to provide an atomic block, wherein an atomic block appears equivalent by side-channel analysis; and choosing the coordinates based on a ratio of I/M where I and M are the time required to execute an inversion and a multiplication in the ground field respectively.

BRIEF DESCRIPTION OF THE DRAWINGS

Embodiments of the present invention will now be described, by way of examples only, with reference to the accompanying drawings.

FIG. 1B is a curve showing a schematic power trace from a ECC-system with side channel atomicity enabled as known in the art.

FIGS. 2A to 2C are tables showing elliptic curve doubling in Jacobian coordinates, elliptic curve addition in mixed affine/Jacobian coordinates, and elliptic curve addition in mixed Chudnovsky-Jacobian/Jacobian coordinates, all in accordance with the present invention.

FIGS. 3A and 3B are matrices showing scalar multiplication on the NIST elliptic curves assuming a high I/M ratio in FIG. 3A, and assuming a low I/M ratio in FIG. 3B, both in accordance with the present invention.

FIGS. 4A and 4B are schematic flow diagrams of the steps of doubling and addition in accordance with the present invention.

DETAILED DESCRIPTION OF THE INVENTION

Figure 1A:
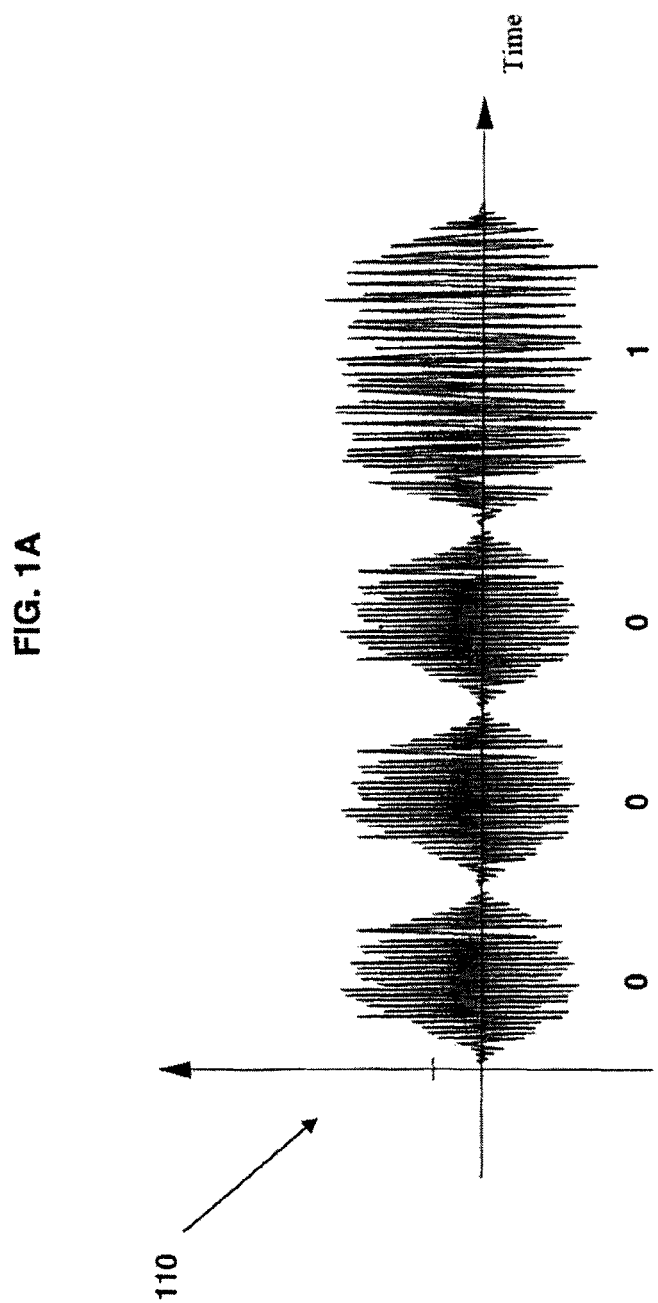
FIG. 1A a curve showing a schematic power trace from an unprotected ECC-system as known in the art.

Elliptic curve cryptography (ECC) is an approach to public-key cryptography based on the algebraic structure of elliptic curves over finite fields. The most time-consuming operation performed in an ECC-system is the so-called scalar multiplication. When implementing an ECC-system, two important choices must be made. The first is which method to use for scalar multiplication. The second is which coordinate representation to use for the elliptic curve being used. The optimal coordinate representation depends on the specific computational environment (processor power, memory, available software, etc.). The efficiency of the system depends heavily on these choices.

A scalar multiplication algorithm in an ECC-system is, basically, a sequence of elliptic curve additions (ECADD) and doublings (ECDBL).

The described method is constituted by atomic specifications of ECADD and ECDBL which take mixed coordinates and curve type into account. A detailed introduction to scalar multiplication in ECC-systems can be found in L. Elmegaard-Fessel, "Efficient Scalar Multiplication and Security against Power Analysis in Cryptosystems based on the NIST Elliptic Curves Over Prime Fields", 2006, (referred to herein as Elmegaard-Fessel).

Known methods of countermeasures against side channel analysis use scalar multiplication algorithms with uniform behaviour or alter the scalar multiplication scheme to ensure a fixed pattern of ECDBL and ECADD. This means that the scalar multiplication is made atomic with the "atoms" as ECADD and ECDBL.

There is a lot to gain by moving the atomicity approach to the level of field operations. For example, as described in Chevallier-Mames et al. This approach is adapted in the present method to apply to mixed coordinate representations and to apply to the NIST curves.

A process is defined as a sequence of instructions operating on the elements of $F_p$, e.g., addition or multiplication in $F_p$. Sequences $I_i$ and $I_j$ of instructions are said to be side channel equivalent and can be written $I_i \sim I_j$, if $I_i$ and $I_j$ cannot be distinguished through observation of their individual power consumption traces.

Definition of side channel atomicity. Let $\Pi\{=\Pi_0, \ldots, \Pi_n\}$ be a set of processes. A common side channel atomic block $\Gamma$ for $\Pi$ is a sequence of instructions such that for all $i \in \{0 \ldots, n\}$ there exists a set of sequences of instructions $\{\gamma_{i1}, \ldots, \gamma_{isi}\}$ with $\gamma_{ij} \sim \Gamma$ for all $j=1 \ldots, $ si and $$\Pi_i = \gamma_{i1} \| \gamma_{i2} \| \ldots \| \gamma_{isi}$$

The instruction sequences $\gamma_{ij}$ are called side channel atomic blocks.

A common side channel atomic block $\Gamma$ always exists for any given $\{\Pi_0, \ldots, \Pi_n\}$. To see this, it should be noticed that dummy field operations can be added to the individual processes $\Pi_0, \ldots, \Pi_n$ in order to make them side channel equivalent. A more difficult task is to find a $\Gamma$ which is minimal with respect to the ordering which results from first considering the number of field multiplications, second the number of additions and third the number of negations.

Example 1

To illustrate the idea of side channel atomicity, consider the double and add algorithm in the setting of a general multiplicatively written group G:

---
Algorithm 1: Square and multiply.
---
Input: $x \in G$ and $k = (k_{l-1}...k_0)_2$.
Output: $x^k \in G$.
  1. $R \leftarrow x; i \leftarrow l - 2;$
  2. while $i \geq 0$ do
  3.    $R \leftarrow R^2;$
  4.    if $k_i = 1$ then
  5.      $R \leftarrow R \cdot x;$
  6.    end if
  7.    $i \leftarrow i - 1;$
  8. end while
  9. return R Algorithm 1 is obviously vulnerable to SPA, as the multiplication in line 5 is executed if, and only if, $k_i=1$. To secure the algorithm, the aim is to identify a common side channel atomic block $\Gamma$ such that Algorithm 1 can be written as a sequence of repetitions of $\Gamma$. The naïve choice for $\Gamma$ is a block consisting of a squaring and a multiplication. This results in the square and multiply always algorithm shown in Algorithm 2. This algorithm requires $2(l-1)$ group multiplications.

---
Algorithm 2: Square and multiply always.
---
Input: $g \in G$ and $k = (k_{l-1}...k_0)_2$.
Output: $g^k \in G$.
  1. $R_0 \leftarrow g; i \leftarrow l - 2;$
  2. while $i \geq 0$ do
  3.    $R_0 \leftarrow R_0^2;$
  4.    $R_{1-ki} \leftarrow R_{1-ki} \cdot g;$
  5.    $i \leftarrow i - 1;$
  6. end while
  7. return $R_0$ Instead, assuming that a squaring can be performed by executing a multiplication and that the instructions R←R·R and R←R·x are side channel equivalent, one can let Γ consist of:
1) A multiplication (which might be a squaring).
2) An XOR of two bits.
3) An integer substitution.

This results in the SPA resistant method shown in Algorithm 3.

---

Algorithm 3: SPA resistant square and multiply.

Input: $x \in G$ and $k = (k_{l-1}...k_0)_2$
Output: $x^k \in G$.
1. $R_0 \leftarrow x$; $R_1 \leftarrow x$; $i \leftarrow l - 2$; $s \leftarrow 0$;
2. while $i \geq 0$ do
3.     $R_0 \leftarrow R_0 \cdot 0\ R_s$;
4.     $s \leftarrow s \oplus k_i$; //XOR of two bits;
5.     $i \leftarrow i - \neg(s)$;
6. end while
7. return $R_0$

---

Algorithm 3 requires only $3(l-1)/2$ group multiplications on average, the same as the unprotected version (under the assumption that M=S).

In general, finding a common side channel atomic block Γ for $\Pi = \{\Pi_0, \ldots, \Pi_n\}$ works as follows: Assume the existence of five disjoint classes of side channel equivalent operations:
1) Modular multiplication of two registers $R_i$ and $R_j$ where possibly i=j.
2) Modular addition and subtraction of two registers.
3) Arithmetical and logical operations performed by the arithmetic logic unit (ALU) of the CPU.
4) Equality testing of two CPU registers.
5) Loading/storing of values.

If the hardware does not correspond to these assumptions, software implementation of one or more instructions can be used to emulate a suitable environment.

One first identifies a common side channel atomic block Γ for Π. Next, each process $\Pi_j$ is written as:

$$\Pi_i = \gamma_{i1} \| \gamma_{i2} \| \ldots \| \gamma_{is_i}$$

with $\gamma_{ij} \sim \Gamma$ for all i. The naïve way of constructing an SPA resistant algorithm for executing Π requires a time of:

$$(n+1) \cdot \max(s_i) \cdot t(\Gamma), \text{ where } 0 \leq i \leq n,$$

where $t(\Gamma)$ is the number of field multiplications in Γ. The goal is to find instead a Γ satisfying:

$$t(\Pi_i) = s_i \cdot t(\Gamma), i = 0, \ldots, n.$$

Using the notion of side channel atomicity, a version of an algorithm for width-w NAF scalar multiplication can be constructed with mixed coordinates which is secure against SPA.

The choice of coordinate representation used in an ECC-system depends on the ratio I/M where I and M are the time required to execute an inversion and a multiplication in the ground field respectively. When using the curves recommended by NIST there are two cases, as follows.

The I/M ratio is "low", for example, under 60. In this situation one uses a mixture of affine and Jacobian coordinates during scalar multiplication. More specifically, precomputations are done in affine representation while intermediate doublings are done in Jacobian representation. This implies ECADD in mixed affine/Jacobian coordinates and ECDBL in fixed Jacobian coordinates.

The I/M ratio is "high", for example, 60 or over. In this situation one uses a mixture of Chudnovsky-Jacobian and Jacobian coordinates during scalar multiplication. More specifically, precomputations are done in Chudnovsky-Jacobian representation while intermediate doublings are done in Jacobian representation. This implies ECADD in mixed Chudnovsky-Jacobian/Jacobian coordinates and ECDBL in fixed Jacobian coordinates.

Both situations require ECDBL in fixed Jacobian representation. This ECDBL should be atomic and take advantage of the optimizations available for the NIST curves having the coefficient a equivalent to −3 (see Elmegaard-Fessel, Section 2.2). It is known that ECDBL in Jacobian coordinates on the NIST curves can be carried out using four multiplications and four squarings in the ground field. FIG. 2A shows the specification 210 of the ECDBL of the described method. The version of ECDBL in accordance with the described method does not introduce additional multiplications or squarings.

An * in FIGS. 2A, 2B and 2C denotes an operation of the correct type which does not alter the values of any register depended upon by the algorithm.

In the case of a "low" I/M ratio, addition takes place in mixed affine/Jacobian coordinates. An ECADD on the NIST curves using these coordinate representations can be carried out using eight multiplications and three squarings in the ground field. FIG. 2B shows the specification 220 of the described method's ECADD in affine/Jacobian coordinates on the NIST curves. The specification does not introduce any additional multiplications or squarings.

In case of a "high" I/M ratio, addition takes place in mixed Chudnovsky-Jacobian/Jacobian representation. An ECADD on the NIST curves using these coordinate representations can be carried out using 11 multiplications and 3 squarings in the ground field. FIG. 2C shows the specification 230 of described method's ECADD in Chudnovsky-Jacobian/Jacobian coordinates on the NIST curves. The specification does not introduce any additional multiplications or squarings.

Notice that both the described method's ECDBL and ECADD operations are constructed from repetitions of the following sequence: multiplication, addition, negation, addition (all performed in the ground field). It is assumed to be possible to use all possible permutations of M,A,N,A, i.e. MAAN, MANA, MNAA, NAAM, NAMA, NMAA, AANM, AAMN, AMAN, ANAM, AMNA, ANMA. However, several of these may prove to be inefficient.

Notice that the requirements of both atomic ECDBL and atomic ECADD are unchanged from the original formulas, i.e. a requirement of 8M and 11M for atomic ECDBL and ECADD respectively. This is because no dummy field multiplications are used, so only a negligible overhead is introduced by splitting the operations into side channel atomic blocks.

The secure version of the $NAF_w$ (width-w non-adjacent form) scalar multiplication algorithm assuming 'low' I/M ratio is as follows, where δ is defined as $$\delta(k_i) = \begin{cases} 1, & k_i \neq 0 \\ 0, & k_i = 0 \end{cases} \text{ and}$$

$A = \{a_{ij}\}$ is a 19×10 matrix.

---

Algorithm 4: Side channel atomic $NAF_w$ scalar multiplication.

Input: $P \in E(F_p)$, $w > 1$ and $k = (d_l \ldots d_0)_{NAF_w}$
Output: $[k]P \in E(F_p)$.

-continued

Algorithm 4: Side channel atomic $NAF_w$ scalar multiplication.

1. Compute odd multiples $[3]P, \ldots, [2^{w-1} - 1]P$.
2. $(R_1, R_2, R_3) \leftarrow [d_1]P;//R_3 = 1$.
3. $i \leftarrow 1 - 1; s \leftarrow 1; m \leftarrow 0;$
4. while $i \geq 0$ do
5.     $(R_{10}, R_{11}) \leftarrow [d_1]P;//[0]P$ is never used and can be set to any affine point.
6.     $m \leftarrow \neg\, s \cdot (m + 1);$
7.     $s \neg \delta(d_i) \times \left\lfloor \frac{m}{18} \right\rfloor + \neg\, \delta(d_i) \times \left\lfloor \frac{m}{7} \right\rfloor$
8.     $R_{am0} \leftarrow R_{am1} \times R_{am2}$
9.     $R_{am3} \leftarrow R_{am4} + R_{am5}$
10.    $R_{am6} \leftarrow -R_{am6}$
11.    $R_{am7} \leftarrow R_{am8} + R_{am9};$
12.    $i \leftarrow i - s$
13.    end while
14. return $(R_1, R_2, R_3)$ A full version of the scalar multiplication algorithm on the NIST elliptic curves assuming "low" I/M ratio is specified by the matrix shown in FIG. 3A. Scalar multiplication on the NIST elliptic curves assuming "high" I/M ratio is specified by the matrix shown in FIG. 3B.

The described method is easily implemented in any optimized ECC-system which uses the NIST curves (e.g. systems which support the algorithms in Suite B). In practice, the implementation is done by keeping a suitable matrix $A = \{a_{mn}\}$ (either the one in FIG. 3A or the one in FIG. 3B) in memory. The i'th row of A is used to specify the following operations in the ground field:

$R_{ai0} \leftarrow R_{ai1} \times R_{ai2}$ $R_{ai3} \leftarrow R_{ai4} + R_{ai5}$ $R_{ai6} \leftarrow -R_{ai6}$ $R_{ai7} \leftarrow R_{ai8} + R_{ai9}$ Each row of A corresponds to an atomic block which is side channel equivalent to $\Gamma$. The first 8 rows determine the structure of a doubling and the last 11 rows determine the structure of an addition. As the iterations of the main loop are side channel equivalent, the algorithm will expose a structure of: ... $\Gamma\Gamma\Gamma\Gamma$ ... which exposes no information about the scalar.

The scalar multiplication resulting from using the described method is atomic as an attacker only sees a trace consisting of repetitions of power traces from the sequence "M A N A" (multiplication, addition, negation, addition). Additionally, it applies to real-life high performance ECC-systems which use the NIST elliptic curves and mixed coordinate representations.

Referring to FIGS. 4A and 4B, schematic flow diagrams 410, 420 show the atomic steps in doubling and addition sequences in accordance with the described atomicity method.

FIG. 4A shows the 8 atomic steps 412 applied to a point P 414 on an elliptic curve to double the point to obtain $[2]P$ 416. Each atomic step 412 is made up of the operations M, A, N, A.

FIG. 4B shows the 11 or 14 atomic steps 422 applied to the points Q, R 424 on an elliptic curve to add the points to obtain $Q \oplus R$ 426. Again, each atomic step 422 is made up of the operations M, A, N, A.

Figure 5:
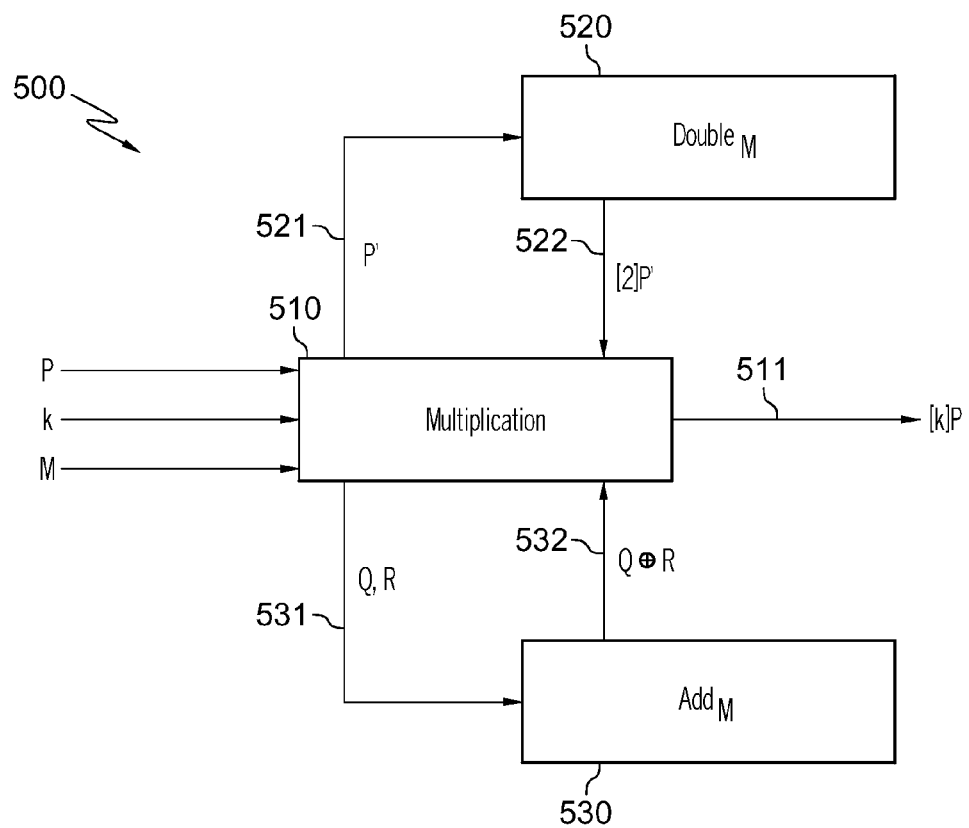
FIG. 5 is a schematic flow diagram of the steps a method in accordance with the present invention.

Referring to FIG. 5, a schematic flow diagram 500 shows the scalar multiplication 510 of a point P on an elliptic curve, by the scalar k, using the atomicity matrix M of the described method.

The multiplication 510 uses the operations of doubling 520 and addition 530. A point P' 521 can be doubled 520 using the atomicity matrix M to result in $[2]P'$ 522. The points Q, R 531 can be added 530 using the atomicity matrix M to result in $Q \oplus R$ 532.

The results of the doublings 520 and additions 530 are used in the multiplication 510 to obtain the scalar multiplication result $[k]P$ 511.

A cryptographic system is provided which includes a means for encryption including the means for applying the side channel atomic scalar multiplication as described. The cryptographic system including means for transferring encrypted data, wherein the encrypted data is protected from side-channel analysis.

Figure 6:
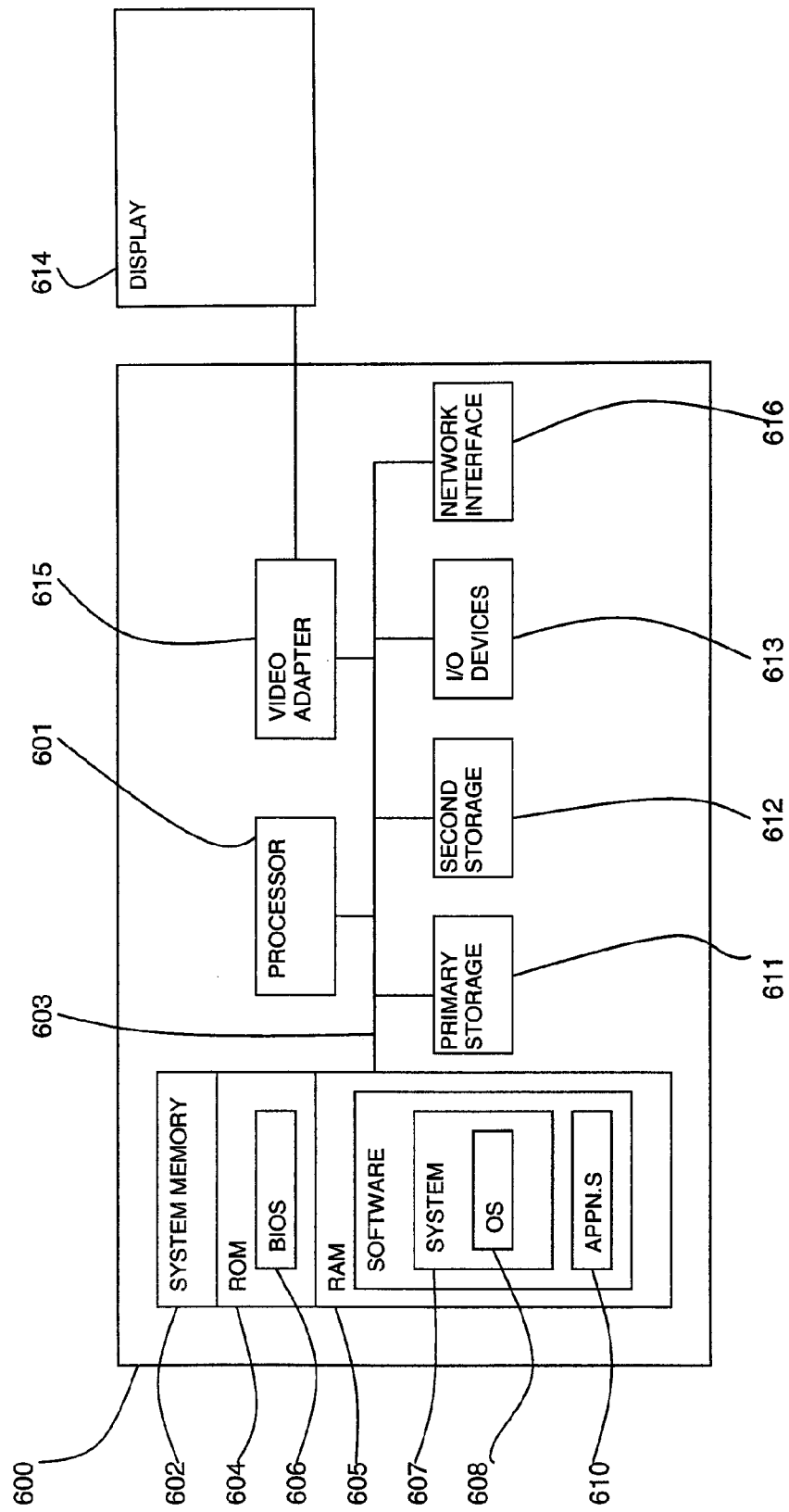
FIG. 6 is a block diagram of a computer system in which the present invention may be implemented.

Referring to FIG. 6, an exemplary system for implementing the described method of ECC-system atomicity includes a data processing system 600 suitable for storing and/or executing program code including at least one processor 601 coupled directly or indirectly to memory elements through a bus system 603. The memory elements can include local memory employed during actual execution of the program code, bulk storage, and cache memories which provide temporary storage of at least some program code in order to reduce the number of times code must be retrieved from bulk storage during execution.

The memory elements may include system memory 602 in the form of read only memory (ROM) 604 and random access memory (RAM) 605. A basic input/output system (BIOS) 606 may be stored in ROM 604. System software 607 may be stored in RAM 605 including operating system software 608. Software applications 610 may also be stored in RAM 605.

The system 600 may also include a primary storage means 611 such as a magnetic hard disk drive and secondary storage means 612 such as a magnetic disc drive and an optical disc drive. The drives and their associated computer-readable media provide non-volatile storage of computer-executable instructions, data structures, program modules and other data for the system 600. Software applications may be stored on the primary and secondary storage means 611, 612 as well as the system memory 602.

The computing system 600 may operate in a networked environment using logical connections to one or more remote computers via a network adapter 616.

Input/output devices 613 can be coupled to the system either directly or through intervening I/O controllers. A user may enter commands and information into the system 600 through input devices such as a keyboard, pointing device, or other input devices (for example, microphone, joy stick, game pad, satellite dish, scanner, or the like). Output devices may include speakers, printers, etc. A display device 614 is also connected to system bus 603 via an interface, such as video adapter 615.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

The invention can take the form of a computer program product accessible from a computer-usable or computer-readable medium providing program code for use by or in connection with a computer or any instruction execution system. For the purposes of this description, a computer usable or computer readable medium can be any apparatus that can contain, store, communicate, propagate, or transport the program for use by or in connection with lie instruction execution system, apparatus or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read only memory (ROM), a rigid magnetic disk and an optical disk. Current examples of optical disks include compact disk read only memory (CD-ROM), compact disk read/write (CD-R/W), and DVD.

Improvements and modifications can be made to the foregoing without departing from the scope of the present invention.

The invention claimed is:

1. A method of providing atomicity for cryptosystems based on elliptic curves, comprising:
   using a computing device comprising:
   a side channel atomic scalar multiplication algorithm using mixed coordinates, including:
   repeating a sequence of field operations for each elliptic curve addition or doubling operation to provide an atomic block, wherein the atomic block appears equivalent by side-channel analysis; and
   choosing the coordinates based on a ratio of I/M where I and M are the time required to execute an inversion and a multiplication in the ground field respectively, wherein when the I/M ratio is less than 60, a combination of both affine and Jacobian coordinates are used during scalar multiplication and when the I/M ratio is 60 or more, a combination of both Chudnovsky-Jacobian and Jacobian coordinates are used during scalar multiplication.

2. The method as claimed in claim 1, wherein the side channel atomic scalar multiplication algorithm is optimized for elliptic curves over $F_p$ defined by an equation of the form $y^2=x^3+ax+b$, where a, $b\in F_p$, having a=−3 and b is a real number.

3. The method as claimed in claim 1, wherein the sequence of field operations starts with a multiplication operation.

4. The method as claimed in claim 3, wherein the sequence of field operations is a multiplication, an addition, a negation, and an addition.

5. An elliptic curve cryptography system (ECC-system) providing atomicity, comprising:
   means for encryption including means for applying a side channel atomic scalar multiplication using mixed coordinates, including:
   means for repeating a sequence of field operations for each elliptic curve addition or doubling operation to provide an atomic block, wherein the atomic block appears equivalent by side-channel analysis; and
   means for choosing the coordinates based on a ratio of I/M where I and M are the time required to execute an inversion and a multiplication in the ground field respectively, wherein when the I/M ratio is less than 60, a combination of both affine and Jacobian coordinates are used during scalar multiplication and when the I/M ratio is 60 or more, a combination of both Chudnovsky-Jacobian and Jacobian coordinates are used during scalar multiplication; and
   means for transferring encrypted data, wherein the encrypted data is protected from side-channel analysis.

6. The ECC-system as claimed in claim 5, wherein the means for encryption is optimized for elliptic curves over $F_p$ defined by an equation of the form $y^2=x^3+ax+b$, where a, $b\in F_p$, having a=−3 and b is a real number.

7. The ECC-system as claimed in claim 5, wherein the means for repeating a sequence of field operations, includes a sequence starting with a multiplication operation.

8. The ECC-system as claimed in claim 7, wherein the means for repeating a sequence of field operations, includes a sequence of a multiplication, an addition, a negation, and an addition.

9. A computer program product stored on a non-transitory computer readable storage medium, comprising computer readable program code means for performing the steps of, when executed on a computer:
   a side channel atomic scalar multiplication algorithm using mixed coordinates, including:
   repeating a sequence of field operations for each elliptic curve addition or doubling operation to provide an atomic block, wherein the atomic block appears equivalent by side-channel analysis; and
   choosing the coordinates based on a ratio of I/M where I and M are the time required to execute an inversion and a multiplication in the ground field respectively, wherein when the I/M ratio is less than 60, a combination of both affine and Jacobian coordinates are used during scalar multiplication and when the I/M ratio is 60 or more, a combination of both Chudnovsky-Jacobian and Jacobian coordinates are used during scalar multiplication.

\* \* \* \* \*